(No Model.)

S. W. SMITH.
METAL COCK OR TAP.

No. 362,326. Patented May 3, 1887.

WITNESSES:
C. Neveux
C. Sedgwick

INVENTOR:
S. W. Smith
BY Munn & Co
ATTORNEYS.

UNITED STATES PATENT OFFICE.

SAMUEL WAGSTAFF SMITH, OF PINLEY HOUSE, NEAR COVENTRY, COUNTY OF WARWICK, ENGLAND.

METAL COCK OR TAP.

SPECIFICATION forming part of Letters Patent No. 362,326, dated May 3, 1887.

Application filed October 23, 1886. Serial No. 216,936. (No model.) Patented in England June 23, 1885, No. 7,599.

*To all whom it may concern:*

Be it known that I, SAMUEL WAGSTAFF SMITH, of Pinley House, near Coventry, in the county of Warwick, England, have invented new and useful Improvements in Metal Cocks or Taps, (for which Letters Patent No. 7,599, dated June 23, 1885, have been granted by Great Britain,) of which the following is a full, clear, and exact description.

My invention consists in a cock or tap of novel construction in which an axially-rotatable and longitudinally-movable stem, preferably a screw one, has combined with it a valve capable of rotation along with the stem, but admitting of an independent longitudinal movement of the stem after the valve has been adjusted to its seat, substantially as hereinafter described, and pointed out in the claim, whereby the valve is made to clean and reface both itself and its seat, as herein set forth.

The invention is applicable to cocks, passvalves, and valvular structures of various kinds, including hydrants, and wherever a valve or tap is required to control the flow of high pressure, hot and cold water or steam, and other fluids, vapors, or gases.

Reference is to be had to the accompanying drawings, forming a part of this specification, in which similar letters of reference indicate corresponding parts in both the figures.

Figure 2:
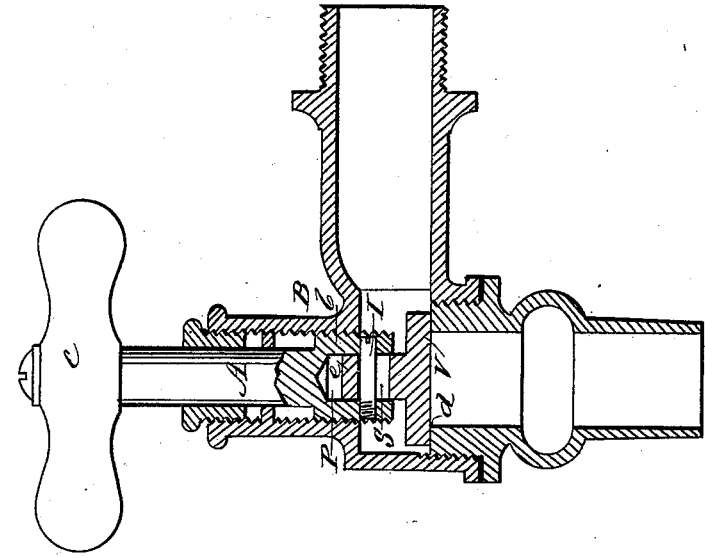
Figure 1:
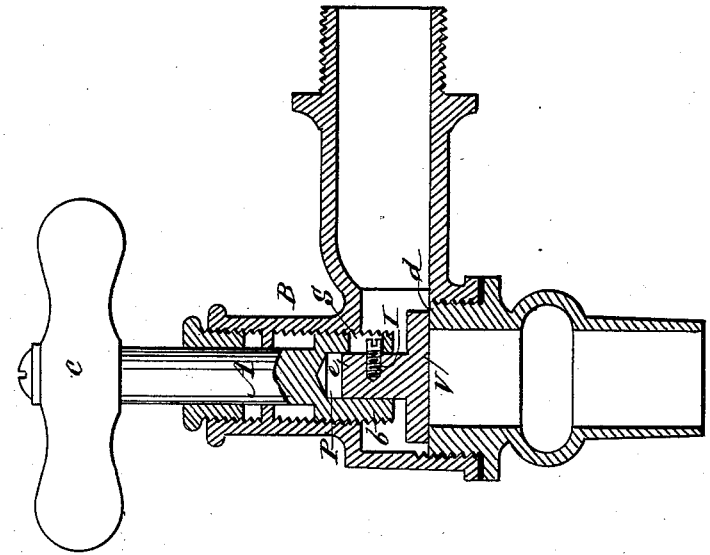

Figure 1 represents a mainly longitudinal section of a cock or tap embodying my invention; and Fig. 2, a mainly longitudinal section similar to Fig. 1, but showing like parts under a modified construction.

In Fig. 1, A is the rotatable and longitudinally-movable stem of the cock, here shown as constructed with an enlarged inner end portion, $b$, having a screw-thread on its exterior, which engages with a screw-thread in the barrel B of the cock, and whereby on turning said stem, as through a handle, $c$, on its outer end, the stem is longitudinally moved, as required. V is the valve, adapted to close upon or against the seat $d$ of the cock, and connected in a free manner with the inner end portion, $b$, of the stem A, by a stud, $e$, on the back of the valve entering loosely within an axial recess, P, in the portion $b$, and further uniting the parts $b$ and $e$ by a screw or pin, I, fitted to pass freely through a longitudinal or oblong slot, S, in the portion $b$ of the stem, and which serves as a means for suspending the valve. To close the cock, the stem A is screwed down or in, both valve and stem moving together longitudinally until the valve V rests upon its seat $d$, after which, by still continuing to work the stem in the same direction, the valve will be simply rotated, while the stem will both be rotated and moved inward longitudinally, the socket or recess P being made sufficiently deep for the purpose, and the slot S sufficiently long therefor, but ultimately the valve V will be firmly pressed down on its seat by the stem.

Fig. 2 shows substantially the same construction, and the action is the same; but the oblong slot S is made in the stud $e$ on the back of the valve, and the suspension-pin I is made a fixture in the portion $b$ of the stem.

By the rotation of the valve after it rests on its seat said valve is made to clean and reface both itself and its seat. Said valve will rotate or slide on its seat both before and after the water or other fluid or steam is shut off. This rotation and grinding action will repair at once any damage caused by the cutting and destructive force of high pressure, steam, or water controlled by the valve, and will clean off the ordinary lime-scale, rust, or oxide. The cuts made by such fluids are at first very small, but once made they rapidly increase in size, and unless repaired sooner or later render ordinary metal and other valves useless. In my invention the greater the pressure on the valve the better the valve will grind and polish both itself and its seat.

Having thus fully described my invention, I claim as new and desire to secure by Letters Patent—

The combination, with the threaded barrel and the seat, of the threaded stem having an axial socket, and provided with a vertical slot leading from its outer face into said socket, a valve having a vertical stud on its upper face freely movable in the said socket, and a transverse pin extending through the slot into the valve-stud, substantially as set forth.

SAMUEL WAGSTAFF SMITH.

Witnesses:
GEORGE COLEMAN,
REGINALD RODGER,
*Both of 63 Ship Street, Brighton, England, Clerks to Mr. Edwin Boxall, of Brighton, England, Solicitor and Notary Public.*